US010785210B2

(12) United States Patent
Lin et al.

(10) Patent No.: US 10,785,210 B2
(45) Date of Patent: Sep. 22, 2020

(54) USER-ENABLED, TWO-FACTOR AUTHENTICATION SERVICE

(71) Applicant: Verizon Patent and Licensing Inc., Arlington, VA (US)

(72) Inventors: Zhijian Lin, Dublin, CA (US); Kumar Sanjeev, San Ramon, CA (US); Brandon James Martella, Brentwood, CA (US); Ashwin R. Kamath, San Ramon, CA (US); Dongliang Hu, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 440 days.

(21) Appl. No.: 15/004,939

(22) Filed: Jan. 23, 2016

(65) Prior Publication Data

US 2017/0214679 A1 Jul. 27, 2017

(51) Int. Cl.
| | |
|---|---|
| *G06F 21/31* | (2013.01) |
| *G06F 21/45* | (2013.01) |
| *G06F 21/60* | (2013.01) |
| *H04L 29/06* | (2006.01) |
| *H04W 4/14* | (2009.01) |

(52) U.S. Cl.
CPC ............. *H04L 63/083* (2013.01); *H04W 4/14* (2013.01); *H04L 2463/082* (2013.01)

(58) Field of Classification Search
CPC ......... H04L 63/08; H04L 63/10; H04L 63/18; H04L 63/20; H04L 63/083; H04L 63/102; H04L 67/42; G06F 21/31; G06F 21/45; G06F 21/60

See application file for complete search history.

(56) References Cited

U.S. PATENT DOCUMENTS

| | | | | |
|---|---|---|---|---|
| 2006/0015743 | A1* | 1/2006 | Camaisa ................. | G06F 21/31 713/182 |
| 2007/0136573 | A1* | 6/2007 | Steinberg ................ | G06F 21/32 713/155 |
| 2009/0300745 | A1* | 12/2009 | Dispensa ............ | H04L 63/0869 726/7 |
| 2010/0199338 | A1* | 8/2010 | Craddock ............... | G06F 21/31 726/7 |
| 2012/0030115 | A1* | 2/2012 | Peace .................... | G06Q 20/382 705/44 |

(Continued)

*Primary Examiner* — Alexander Lagor
*Assistant Examiner* — Kalish K Bell (57) ABSTRACT

A user may have real-time control over whether accessing a network service account implements two-factor authentication. When a username and password is provided to log into the network service account, a determination may be made about whether the login attempt is a potential security threat. When the login attempt does not appear to be a threat, the login attempt may be processed based on the username and password. When the login attempt is a potential security threat, the actual user corresponding to the network service account may be notified and asked to confirm whether the login attempt is a security threat. When the user confirms that the login attempt is not a security threat, the user may be logged in based on the username and password. When the user confirms that the login attempt is a security threat, two-factor authentication may be implemented for accessing the network service account.

20 Claims, 8 Drawing Sheets

(56) References Cited

U.S. PATENT DOCUMENTS

| | | | |
|---|---|---|---|
| 2014/0208406 A1* | 7/2014 | Austin | H04L 63/02 726/7 |
| 2015/0067890 A1* | 3/2015 | Bataller | G06Q 10/00 726/28 |
| 2017/0061713 A1* | 3/2017 | Krishnan | G06F 21/31 |
| 2017/0155675 A1* | 6/2017 | Howe | H04L 63/0428 |

* cited by examiner

USER-ENABLED, TWO-FACTOR AUTHENTICATION SERVICE

BACKGROUND

The Internet has made a wide variety of services readily available to users. Examples of such services may include social networking services, banking services, communication services (e.g., email, instant messaging and video calls), etc. However, a pervasive concern in providing such services is maintaining a level of security intended to prevent individuals from accessing the services unlawfully. As such, users must often be authenticated before accessing network services. In some scenarios, the user may only be required to provide a username and password in order to access certain services.

However, current security trends may require additional authentication information from the user in order to enhance security. Examples of such information may include a portion of a user's social security number (e.g., the last four digits) or biometric information of the user (e.g., fingerprints, a retina scan, a voice input, etc.). These types of security schemes are sometimes referred to as two-factor authentication, where the username and password are one factor and the additional authentication information is the other factor. While two-factor authentication services may increase the security of a network or service, requiring the user to provide additional authentication information, which may increase the time and effort required to access a service.

As such, the two-factor authentication services that are currently available may pit the need for security against user demand for ease-of-use products and services. Depending on the scenario, therefore, a business that requires two-factor authentication (in order for customers to access a given service) may be more effective at protecting their customers and services from unlawful access. However, doing so may cause the service to be less appealing to others (e.g., potential customers) because of the time and energy that may be required to provide additional authentication information (e.g., beyond, for example, an appropriate username and password).

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Techniques described herein may be used to provide a user with real-time control over whether accessing a network service, associated with the user, implements two-factor authentication. For example, a first user may register for a network service (e.g., an online banking service, an email service, a social networking service, etc.) provided by an application server. As used herein, "network service" or "network service account" may include a particular instance of a network service associated with a particular user or user identity. For instance, a network service corresponding to an email service may include an email account associated with a particular email address (as opposed to, for example, all of the email accounts of a particular domain).

After registration, a second user may provide authentication information (e.g., a username and password) to the application server in order to access (e.g., log into) the network service account. Before granting the second user access to the network service account, a determination may be made about whether the login attempt appears to be a security threat (e.g., an attempt by an unauthorized user to access the network service account). When the login attempt does not appear to be a security threat, the application server may authenticate the user based on the authentication information provided (e.g., the username and password).

However, when the login attempt appears to be a security threat, the first user may be notified about the login attempt and asked to confirm whether the login attempt is indeed a security threat. When the first user confirms that the login attempt is not a security threat, the application server may log in the second user based on the authentication information. However, when the first user confirms that the login attempt is a security threat, the application server may terminate the login session corresponding to the second user and automatically enable two-factor authentication for subsequent attempts to access the network service account. Additionally, since the user associated with the network service account is able to confirm that a login attempt is a security threat and cause two-factor authentication to be implemented, prior to the login request being processed, the techniques described herein may enable the user to respond to security threats in real-time.

Figure 1:
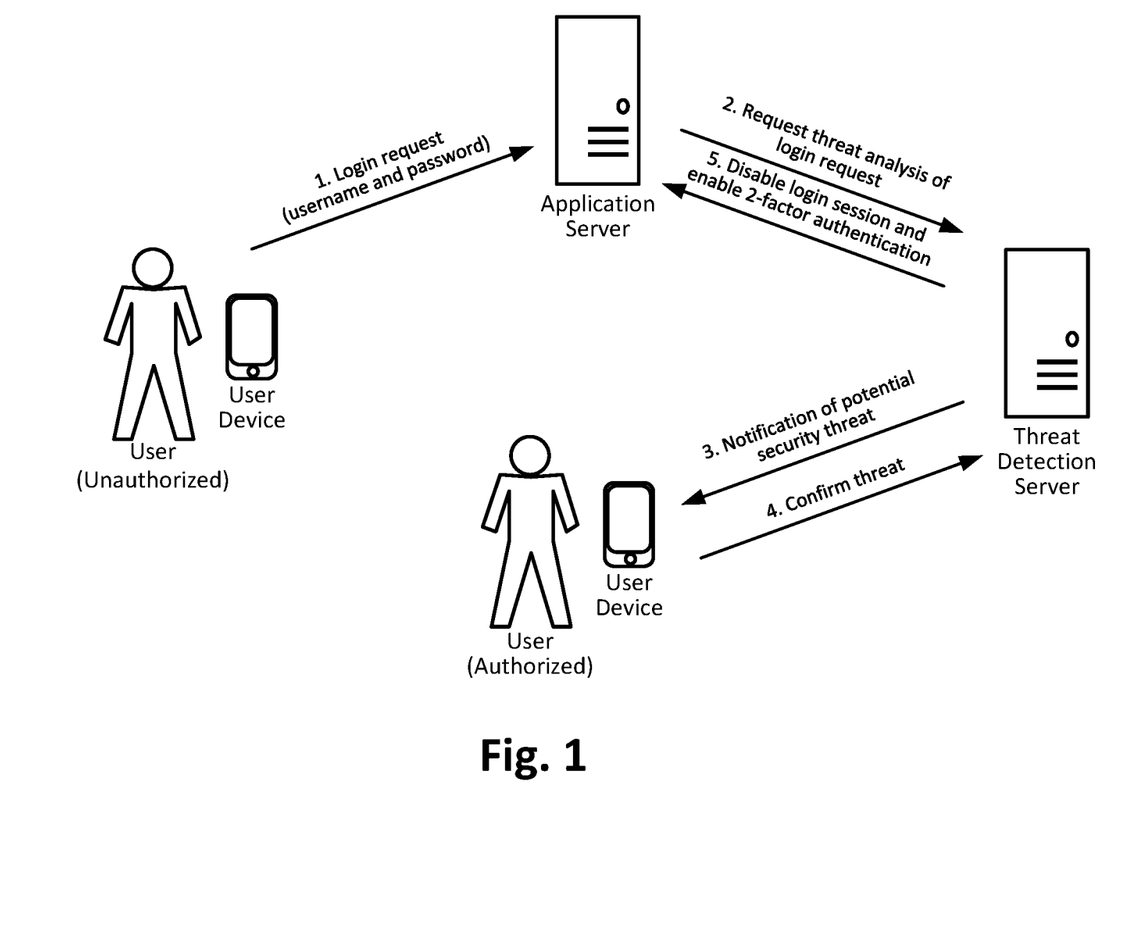
FIG. 1 illustrates an example overview of an implementation described herein.

FIG. 1 illustrates an example overview of an implementation described herein. As shown, a user may attempt to access a network service, provided by an application server, by providing a username and password to the application server (at 1). The application server may request that the login request be analyzed by a threat detection server in order to determine whether the request appears to be a potential security threat (at 2). If the request does not appear to be a security threat, the threat detection server may respond to the application server by causing the application server to log the user in based on the username and password provided previously.

If the threat detection server determines that the login request appears to be a security threat, the threat detection server may determine a mobile device number (MDN) or a user device associated with the network service account (e.g., the MDN of a user that created the network service account). The threat detection server may communicate a message, to the user device, to notify the user of the user device about the potential security threat (line 3). In some implementations, the message may include a Short Messaging Service (SMS) message, a multimedia messaging service (MMS) message, an email, an instant message, or another type of message.

The user device may notify the user regarding the security threat and prompt the user to confirm whether the potential security threat (e.g., the login request) is an actual security threat. In some implementations, the confirmation may be sent to the threat detection server via the same type of message used to notify the user of the potential security threat. In some implementations, the user device of the authorized user may use a different type of message (than the type of message used to notify the user of the potential security threat) to send the confirmation to the threat detection server. When the user confirms that the login attempt is not a security threat, the threat detection server may cause the application server to process the login request using single-factor authentication or another type of authentication procedure that may authenticate the corresponding user device based on the username and password in the login attempt. For the purposes of describing FIG. 1, assume that the login request is part of an actual security threat.

When the user confirms that the login attempt is an actual security threat, the user device may send a message to the threat detection server indicating that the potential security threat is not an actual security threat (at 4). In some implementations, the message may also, or alternatively, include an explicit instruction or request that two-factor authentication be implemented for subsequent attempts to access the network service account. In some implementations, the request or instruction to implement two-factor authentication may, for example, be implied by the message confirming that the login request is an actual security threat. Similar to the notification sent to the user, the message may include an SMS message, an MMS message, an email message, or another type of established electronic communications medium. The threat detection server may cause the application server to disable a login session corresponding to the login request and/or enable two-factor authentication for the network service account (at 5).

In some implementations, the second factor, in the two-factor authentication service, may involve the participation of the user device corresponding to the user that enabled the two-factor authentication service. For example, the second factor in the two-factor authentication service may include a message (e.g., an SMS message, an MMS message, an email, etc.) with a particular code being sent to the user device and requiring the user of the user device to then provide the particular code to the application server. In such implementations, the two-factor authentication service may only be completed successfully using the same device that enabled the two-factor authentication service. As such, techniques described herein may enable a user registered for a network service to enable, in real-time (e.g., in response to a login attempt from another user), two-factor authentication services for a particular network service and/or account.

Figure 2:
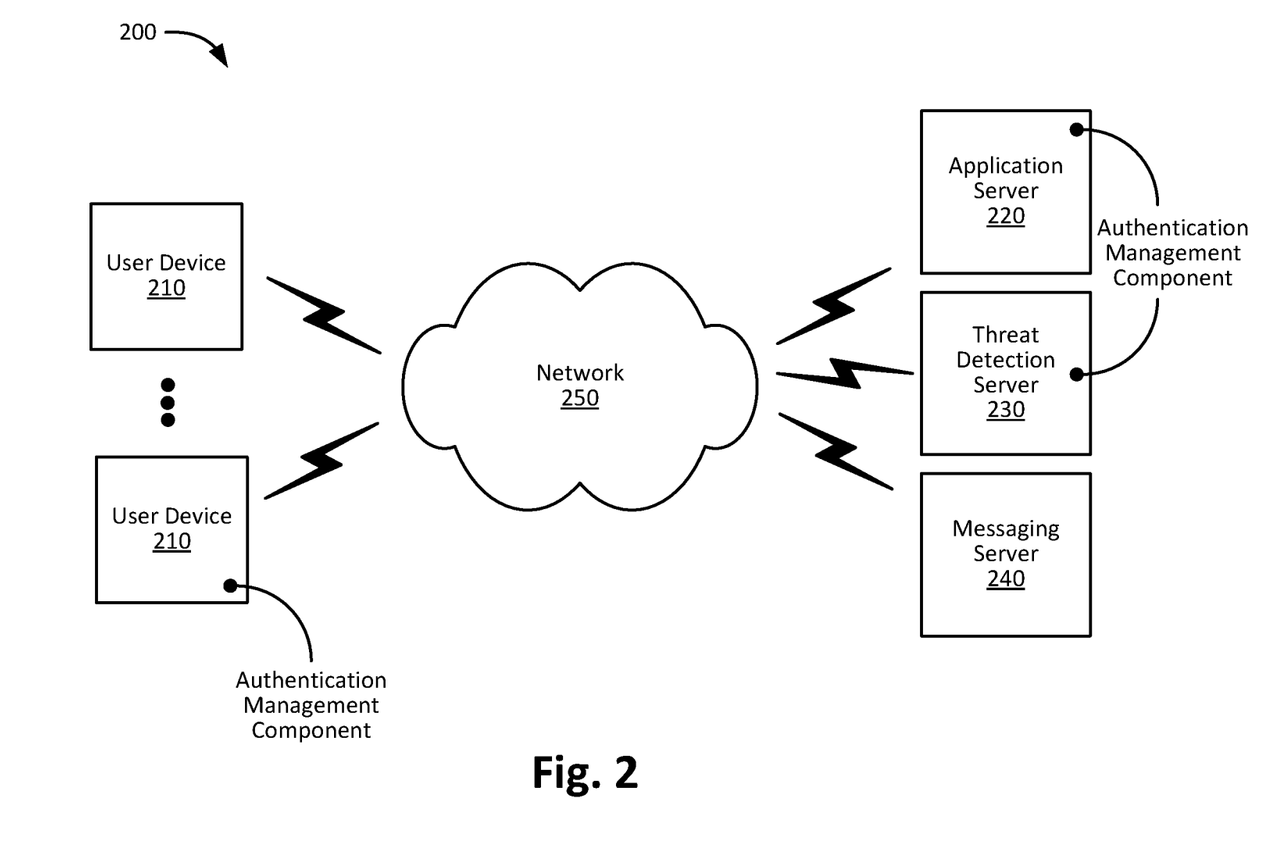
FIG. 2 is a diagram of an example environment in which systems and/or methods described herein may be implemented.

FIG. 2 is a diagram of an example environment 200 in which systems and/or methods described herein may be implemented. Environment 200 may include one or more user devices 210, application server 220, threat detection server 230, messaging server 240, and network 250.

User device 210 may include a portable computing and communication device, such as a personal digital assistant (PDA), a smart phone, a cellular phone, a laptop computer with connectivity to a cellular wireless network, a tablet computer, etc. User device 210 may also include non-portable computing devices, such as a desktop computer, a consumer or business appliance, or other devices that have the ability to connect to network 250. User device 210 may also include a computing and communication device that may be worn by a user (also referred to as wearable devices) as a watch, a fitness band, a necklace, glasses, an eyeglass, a ring, a belt, a headset, or another type of wearable device.

As depicted, user device 210 may include a component, such as authentication management software, that may enable user device 210 to perform one or more of the operations described herein, such as receiving a notification of a potential security threat, prompting a user of user device 210 regarding the potential security threat, receiving a confirmation about whether the potential security threat is an actual security threat, and responding to the notification of the potential security threat. In some implementations, user device 210 may be capable of performing such operations without specialized software. For instance, a notification of a potential security threat may be received (e.g., via a SMS message, an MMS message, an email message, and/or some other type of message) from messaging server 240 and presented to the user of user device 210. Additionally, the user may respond to the notification by, for example, sending a particular code (e.g., "Yes", "No", "Stop", "OK", etc.) in a message (which may be the same type, or a different type, of message as the notification) to messaging server 240.

Application server 220 may include one or more computing devices, such as a server device or a collection of server devices, capable of providing a network service account (e.g., an online banking service, an email service, an instant messaging service, a social networking service, etc.) to user devices 210. Application server 220 may also, or alternatively, perform one or more authentication procedures before providing access to the network service account of a particular user. The network service account may include information corresponding to a user of user device 210, such as a name of the user, an email address, an MDN of a user device of the user, a street address, other user devices 210 associated (e.g., user devices 210 used in the past to login to the network service account) with the network service account, locations associated with the network service account (e.g., location from which a user has logged into the network service account), times of day (e.g., times of day when the network service account has been accessed in the past), etc. In some implementations, application server 220 may be owned and/or operated by an organization (e.g., an academic institution, a research institution, a business, a government agency, etc.) other than a network service provider.

As depicted, network application server 220 may include a component, such authentication management component, which may enable network authentication server 220 to perform one or more of the operations described herein. For instance, the authentication management component may enable application server 220 to register a user for a network service, create an account (e.g., a network service account) for the user, receive a login attempt from user device 210, and request that threat detection server 230 analyze the login attempt to determine whether the login attempt is a potential security threat. Additionally, or alternatively, the authentication management component may enable application server 220 to receive instructions from threat detection server 230 regarding the login attempt, and implement one or more authentication services (e.g., an authentication service based solely on a username and password, a two-factor authentication service, etc.) based on the instructions from threat detection server 230.

Threat detection server 230 may include one or more computing devices, such as a server device or a collection of server devices, capable of determining the likelihood of whether a particular login attempt is a security threat. In some implementations, threat detection server 230 may make such a determination based on information associated with the login attempt (e.g., a location of user device 210 at the time of the login attempt, a time of the login attempt, a username, a password, an MDN of user device 210, etc.). Additionally, or alternatively, threat detection server 230 may make such a determination based on information associated with the network service account for which the login attempt is being made (e.g., geographic locations of previous login attempts, times of day of previous login attempts, certain user devices 210 of previous login attempts, etc.). As mentioned above, the information used by threat detection server 230 to determine whether there is a potential security threat may come from one or more other devices (e.g., application server 220).

For example, as described above, each time threat detection server 230 analyzes a login attempt for a potential security threat, threat detection server 230 (or another device) may create a record of the login attempt. The record may include information that is received from another device, such as application server 220 or another network device. In some implementations, threat detection server 230 may receive some of the information in the record from one device (such as application server 220) and use the information to obtain other information that will be included in the record. For example, application server 220 may provide threat detection server 230 with the IP address used by user device 210 to initiate the login request, and threat detection server 230 may provide the IP address to another network device that maintains a record that associates the MDN of user devices and the IP address that is assigned to each user device upon registering with the network.

For example, each time threat detection server 230 analyzes a login attempt for a potential security threat, threat detection server 230 (or another device) may create a record of the login attempt. The record may include information that is received from another device, such as application server 220 or another network device. In some implementations, threat detection server 230 may receive some of the information in the record from one device (such as application server 220) and use the information to obtain other information that will be included in the record. For example, application server 220 may provide threat detection server 230 with the IP address used by user device 210 to initiate the login request, and threat detection server 230 may provide the IP address to another network device that maintains a record that associates the MDN of user devices and the IP address that is assigned to each user device upon registering with the network.

In some implementations, when the likelihood of a security threat meets or exceeds a preselected threshold, threat detection server 230 may notify a user associated with the network service account that a potential security threat is underway and, based on a response from the user, may cause application server 220 to implement one or more authentication services. As depicted, threat detection server 230 may include a component, such authentication management component, which may enable threat detection server 230 to perform one or more of the operations described herein. In some implementations, threat detection server 230 may be owned and/or operated by a network service provider.

Messaging server 240 may include one or more devices that may store, forward, convert, and deliver messages to and/or from user device 210. Messaging server 240 may be, or may include, for example, an SMSC, an MMS center (MMSC), a simple mail transfer protocol (SMTP) server, a chat application server, and/or some other type of messaging server. In some implementations, messaging server 240 may respond to instructions from threat detection server 230 to send a message to user device 210 regarding a potential security threat. In some implementations, messaging server 240 may receive a message from user device 210. The message may include a confirmation of whether a particular login attempt is, in fact, a security threat. In such implementations, messaging server 240 may relay the message to threat detection server 230 so that threat detection server 230 and application server 220 may respond accordingly.

Network 250 may include one or more wired and/or wireless networks. For example, network 250 may include a cellular network (e.g., a second generation (2G) network, a third generation (3G) network, a fourth generation (4G) network, a fifth generation (5G) network, a LTE network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed IP network, a virtual private network (VPN), an intranet, the Internet, a fiber optic-based network, and/or a combination of these or other types of networks.

Figure 3:
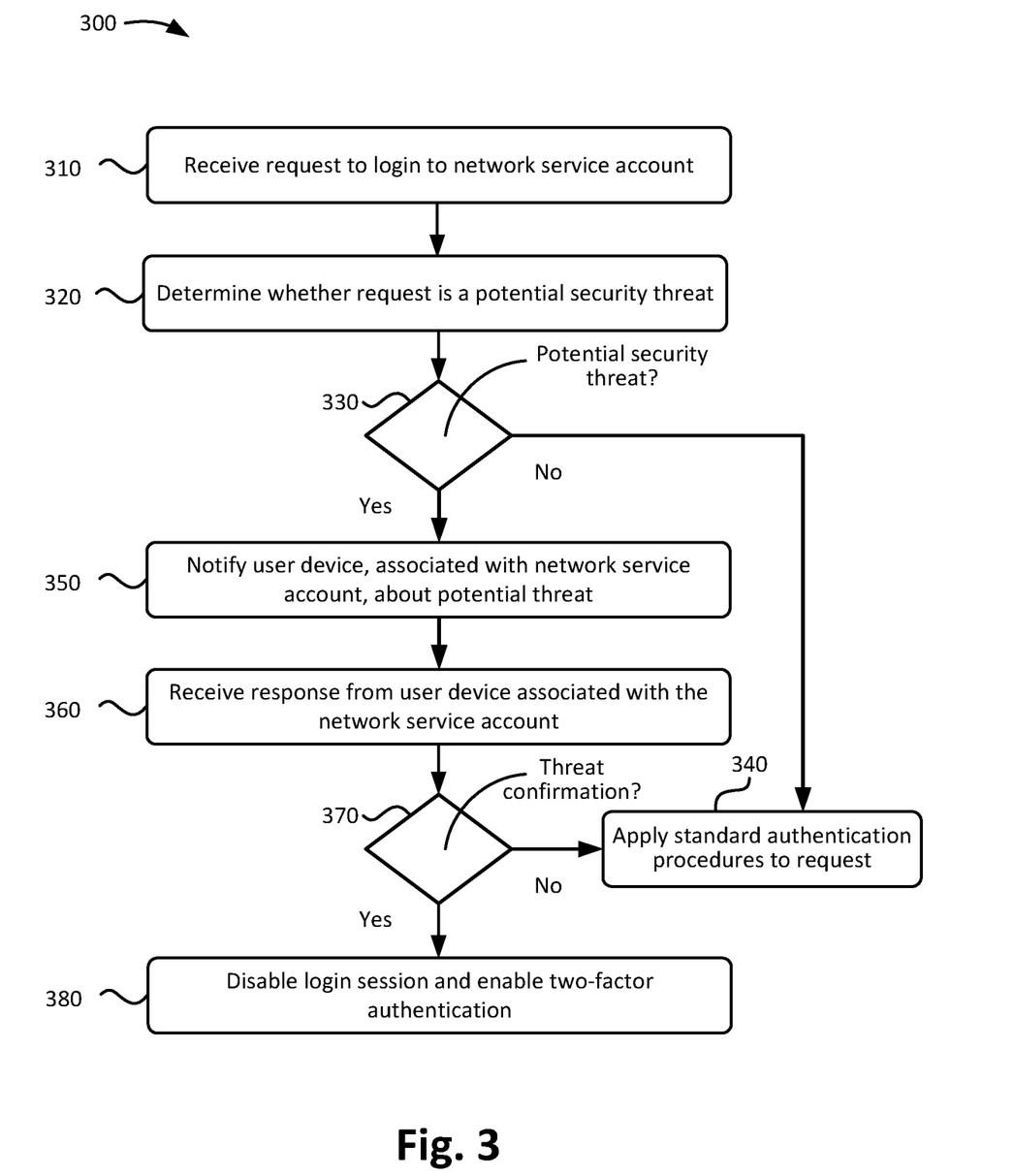
FIG. 3 is a flowchart diagram of an example process for responding to a login attempt.

FIG. 3 is a flowchart diagram of an example process 300 for responding to a login attempt. In some implementations, process 300 may be implemented by one or more of application server 220, threat detection server 230, and messaging server 240.

As shown, process 300 may include receiving a request to login to a network service account (block 310). For example, application server 220 may receive a request, from user device 210, to login to a particular network service account (e.g., an online banking account, an email account, a social networking account, etc.). The request may include a username and password. Additionally, or alternatively, the request may include information associated with the request, such as an identifier of user device 210 (e.g., an Internet Protocol (IP) address, a media access control (MAC) address, etc.), a geographic location of user device 210, a time of day (or night), a browser being used by user device 210, etc.

Process 300 may include determining whether the request is a potential security threat (block 320). For example, application server 220 may send a request to threat detection server 230 to determine whether the request is part of a security threat. In some implementations, the request from application server 220 may include information describing, or corresponding to, the request to login to the network service account. For example, the request from application server 220 may include an IP address of the user device requesting to log into the network service account, the current geographic location of user device 220, a time that the request from user device 210 was sent or received, etc.

Additionally, or alternatively, application server 220 may provide threat detection server 230 with information corresponding to the network service account that user device 210 is attempting to access. For example, application server 220 may provide threat detection server 230 with a username, a password, other user devices 210, a name of a user (e.g., a first name and a last name of a user), an email address, a street address, an MDN, etc.

In some implementations, threat detection server 230 may determine information pertaining to the login attempt and/or information regarding the network service account based on the information from application server 220. For example, each time threat detection server 230 analyzes a login attempt for a potential security threat, threat detection server 230 (or another device) may create a record of the login attempt. The record may include information that is received from another device, such as application server 220 or another network device. In some implementations, threat detection server 230 may receive some of the information in the record from one device (such as application server 220) and use the information to obtain other information that will be included in the record. For example, application server 220 may provide threat detection server 230 with the IP address used by user device 210 to initiate the login request, and threat detection server 230 may provide the IP address to another network device that maintains a record that associates the MDN of user devices and the IP address that is assigned to each user device upon registering with the network.

Examples of information that may be included in, or associated with, the record may include an IP address assigned to user device 210, an MDN of user device 210, the username and password submitted as part of the login request, a time in which the login attempt was initiated, a geographic location of user device 210 at the time of the login request, etc. In some implementations, threat detection server 230 may identify user device 210 based on the MDN of user device 230. In some implementations, threat detection server 230 may obtain the MDN of user device 230 from application server 220. In some implementations, threat detection server 230 may obtain the MDN from another device, such as a data repository that associates MDNs with IP addresses assigned to user devices registered with a service provider network.

As such, when another user device 210 attempts to log into the network service account, threat detection server 230 may determine whether the user device has attempted to access the network service account in the past, whether the user device has attempted to access other network service accounts, how many times and how frequently the user device has attempted to access one or more network service accounts, etc. In some implementations, the user device may be identified by the IP address used by the user device to access a login webpage of application server 220, and the network service account may be identified by the username, the password, and/or a combination of the username and password submitted as part of the login attempt.

Threat detection server 230 may use the information corresponding to the current login attempt and/or information corresponding to previous login attempts of user device 210 to help determine whether there is a potential security risk. For instance, threat detection server 230 may compare the current login attempt of user device 210 with previous login attempts of user device 210 to determine whether there is anything peculiar about the current attempt to login to the network service account, whether the current login attempt in combination with previous login attempts of user device 210 are consistent with a pattern of user device activity indicative (or often associated with) a user and/or user device attempting to unlawfully access a network service account.

The information from application server 220 and/or the information determined by threat detection server 230 may be used to determine the likelihood that the request to login to the network service corresponds to a security threat. For example, threat detection server 230 may determine that the login attempt is a potential security threat if the login attempt is from an IP address and a geographic location that does not correspond to historical IP addresses, geographic locations, and/or times associated with the username and password submitted by user device 210. The types of information involved in determining whether there is a potential security threat may include a straight comparison of current information to historical information.

In some implementations, threat detection server 230 may use one or more thresholds to determine whether a login attempt is sufficiently suspicious to amount to a potential security threat. In some implementations, the analysis performed by threat detection server 230 may be fairly simple. For instance, each factor may be considered equally (e.g., where geographic location is just as important as login request time). In some implementations, a more complicated analysis may be used. For instance, the factors may be assigned a value corresponding to a preselected index, entered into a weighted analysis, and expressed as a percentage (where a particular threshold percentage may be used to determine whether a potential threat exists).

In some implementations, the username and password submitted by user device 210 may be significant in determining whether there is a potential security threat. For example, prior to requesting that threat detection server 230 analyze a login attempt for security threats, application server 220 may perform a preliminary determination of whether the username and password are correct (e.g., whether the username and password could pass an authentication test and grant user device 210 with access to a network service account). In some implementations, application server 220 may only request that threat detection server 230 analyze a login attempt for a potential security threat if the username and password are correct. In some implementations, application server 220 may only request that threat detection server 230 analyze a login attempt for a potential security threat if the username and password are incorrect. In some implementations, application server 220 may only request that threat detection server 230 analyze each login attempt (e.g., regardless of whether a preliminary authentication process is performed).

Figure 4:
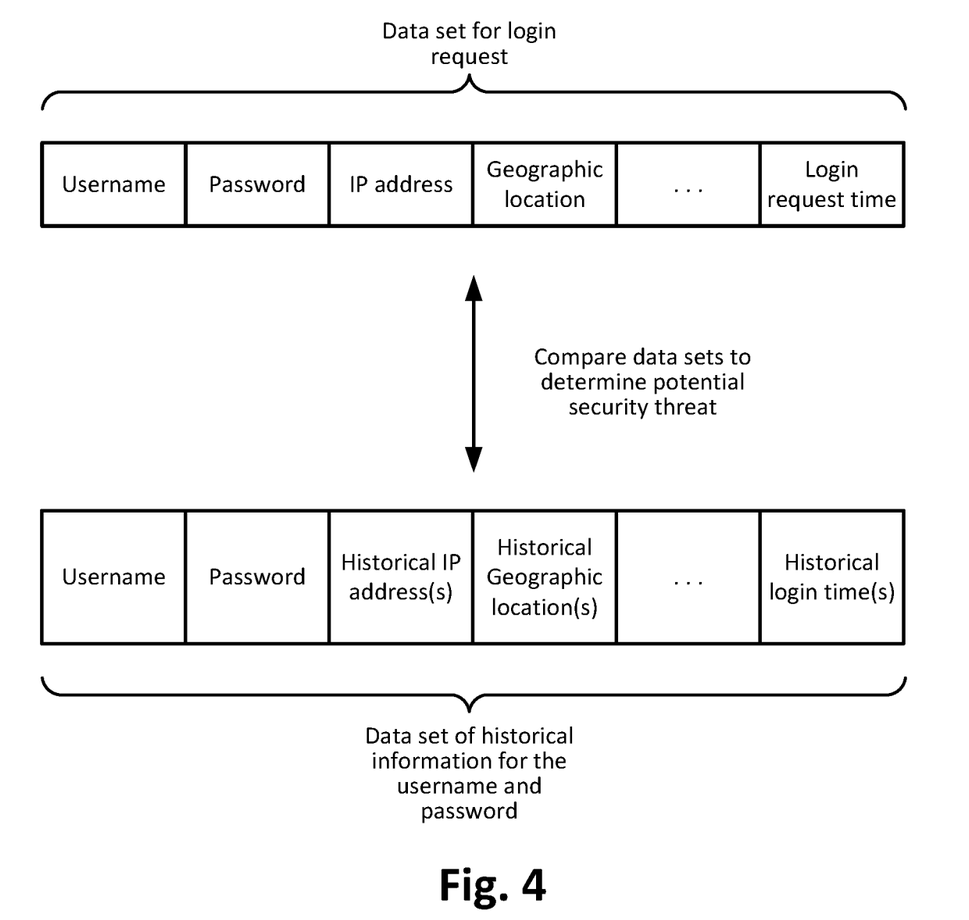
FIG. 4 is a block diagram of an example for determining whether a login request is a potential security threat.

FIG. 4 is a block diagram of an example for determining whether a login request is a potential security threat. As described herein, threat detection server 230 may determine whether a request to login to a network server corresponds to a potential security threat. In some implementations, another device, such as application server 220, may determine whether a request to login to a network server corresponds to a potential security threat.

In some implementations, threat detection server 230 may receive a request from application server 220 to determine whether a particular login request is a security threat. To enable such a determination, application server 220 may provide threat detection server 230 with information corresponding to the login request, such as the username and password provided by user device 210. Application server 220 may also provide threat detection server 230 with additional information, such as the IP address of user device 210, the geographic location of user device 210, the time that the login request was sent by user device 210 and/or received by application server 220, etc.

In some implementations, threat detection server 230 may use the information from application server 220 to create a data set for the login request as shown in FIG. 4. In some implementations, some of the information included in the data set for the login request may be received from application server 220 and some of the information in the data set may be generated by threat detection server 230 or obtained from another source (e.g., a user information repository that is owned and operated by a network service provider).

Threat detection server 230 may create another data set to which the data set for the login request may be compared. For example, threat detection server 230 may use the username and password from the login request to identify previous IP addresses, geographic locations, and login times that have historically been involved with logging into the network service using the same username and password. Examples of additional information that may be part of the data sets may include a type (and/or version) of a browser currently used by user device 210, a type (and/or version) of browser(s) historically used by user device 210, a current orientation of user device 210 (e.g., portrait or landscape), historical orientations of user device 210 during login, current movement information (e.g., velocity) of user device 210, historical movement information of user device 210 during login, etc.

Threat detection server 230 may compare the data set for the login request to the data set of historical information to determine similarities and/or difference between the data sets, which may form the basis of determining whether the login request amounts to a potential security threat. In some implementations, threat detection server 230 may create the data sets based on information other than the username and password of the login request. For instance, threat detection server 230 may create the data sets based on the IP address associated with the login request. In such an implementation, threat detection server 230 may create the data set of historical information by, for example, identifying usernames, passwords, geographic locations, login times, etc., that were previously associated with the IP address.

Threat detection server 230 may implement one or more mathematical, statistical, or analytical tools to evaluate whether there is a potential security threat. For instance, threat detection server 230 may assign a weighted value to each type of information, based on the relevance or importance of the information in determining whether there is a security threat. For example, if the geographic location of user device 210 is considered to be particularly indicative or whether a security threat is occurring, then the geographic location of user device 210 may be assigned greater weight than another type of information, such as login time. Additionally, the relative importance of information may be specific to a user account, a username and password combination, etc. For example, if historical information indicates that the user logs into the network service from seemingly random geographic locations, but almost always around the same time of day, then login time may be given greater weight in identifying a security threat then geographic location.

In some implementations, threat detection server 230 may implement one or more thresholds in determining whether a potential security threat is occurring. For example, threat detection server 230 may use a threshold representing a percentage or level of confidence that a login request corresponds to a security threat. In some implementations, multiple thresholds may be implemented. For instance, threat detection server 230 may perform a preliminary analysis on each type of information included in the data set to determine whether each type of information is adequately indicative (e.g., for the user account in question) of whether there is a security threat. The types of information that are adequately indicative may be included in the data set and used to compare the data set for the login request and the data set of historical information. And if the comparison produces a result that exceeds another threshold, threat detection server 230 may determine that there is a potential security threat underway.

Returning to FIG. 3, when the request to login to the network service does not amount to a potential security threat (block 330-No), process 300 may include applying standard authentication procedures to the request (block 340). For example, when a request to login does not amount to a potential security threat, threat detection server 230 may instruct application server 220 to process the login attempt using single-factor authentication (e.g., logging user device 210 into the network service account based on the username and password). When the request to login includes to a potential security threat (block 330—Yes), process 300 may include notifying a user device, associated with the network service account, about the potential security threat (block 350). For example, threat detection server 230 may determine contact information (e.g., an MDN, an email address, and/or some other identifying information) associated with the network service account (e.g., associated with the user name and password) and may use the contact information to send a notification about the request to login to the network service account. The MDN may have been received from application server 220. The MDN may have been determined by threat detection server 230 based on information received from application server 220. In some implementations, threat notification server 230 may notify the user via message. In some implementations, another form of notification may be used, such as email, instant message, etc.

Process 300 may include receiving a response from the user device associated with the network service account (block 360). For example, threat notification server 230 may receive information from the user device associated with the network service account (and to which the notification was sent at block 350), confirming that the potential threat is an actual threat. Threat notification server 230 may, alternatively, receive information from the user device indicating that the potential security threat is not an actual security threat. In some implementations, the information may be in the form of a message with a particular code, such as "Yes", "No", "Threat", "No threat", "Activate two-factor authentication", etc. In some implementations, the user may confirm the potential security threat by simply selecting a button presented to the user in a graphical user interface (GUI) of user device 210.

In some implementations, the user may confirm that the potential security threat is an actual security threat in one or more other ways. For example, the user may cause user device 210 to send an email, an instant message, a proprietary message, or another type of message with an indication of whether a security threat has actually occurred. An example of a proprietary message may include a dedicated security application that may be integrated into an operating system of user device 210.

When the user confirms that the potential security threat is not an actual security threat (block 370-No), process 300 may include applying standard authentication procedures to the request (block 340). For example, when a request to login does not amount to a security threat (i.e., when a response is received from the user device indicating that the identified potential threat is not a threat), threat detection server 230 may instruct application server 220 to process the login attempt using a single factor authentication service (e.g., logging user device 210 into the network service if the username and password are correct). When the user confirms that the potential threat is an actual security threat (block 370—Yes), the login session, corresponding to the login request, may be disabled and two-factor authentication may be enabled for the network service account (block 380). For example, threat detection server 230 may send instructions, to application server 220, that cause application server 220 to enable two-factor authentication for subsequent attempts to access the network service account. In some implementations, the application server may deny the login attempt from the user device and then, if/when the user device attempts to login again, may require the second factor of the two-factor authentication being implemented. In some implementations, application may instead require the second factor of the two-factor authentication being implemented (without terminating the login attempt).

In some implementations, application server 220 may continue to implement two-factor authentication for the network service account until a user (e.g., the user that enabled the two-factor authentication service) successfully logs into the application server 220 and manually disables the two-factor authentication via a particular webpage (e.g., a settings webpage for the network service account). In some implementations, the two-factor authentication service may be disabled in response to one or more other events. For example, the user may send a message (e.g., a SMS message, a MMS message, an email message, etc.), that may include a particular code or instruction for deactivating the two-factor authentication service, to application server 220. Additionally, or alternatively, the user may send the message to threat detection server 230, and threat detection server 230 may respond to the message by causing application server 220 to disable the two-factor authentication service.

In some implementations, application server 220 may automatically disable the two-factor authentication service in response to the user device that enabled the two-factor authentication service successfully logging into the network service account. In some implementations, the two-factor authentication service may be selectively enabled for one or more user device 210. For instance, in some implementations, the two-factor authentication service may be enabled for only the user device that was part of the security threat (e.g., from which the login request was received at block 310). Additionally, in some implementations, the two-factor authentication service may be enabled for other devices that satisfy one or more criteria, such as user devices that correspond to a particular manufacturer, a particular service provider, a particular current geographic location or area, etc., as the user device that was part of the security threat. In some implementations, the two-factor authentication service may be enabled for all user devices that attempt to access the network service account, except for the user device that was used to confirm that a security threat was underway and/or to cause the two-factor authentication service to be implemented.

Figure 5:
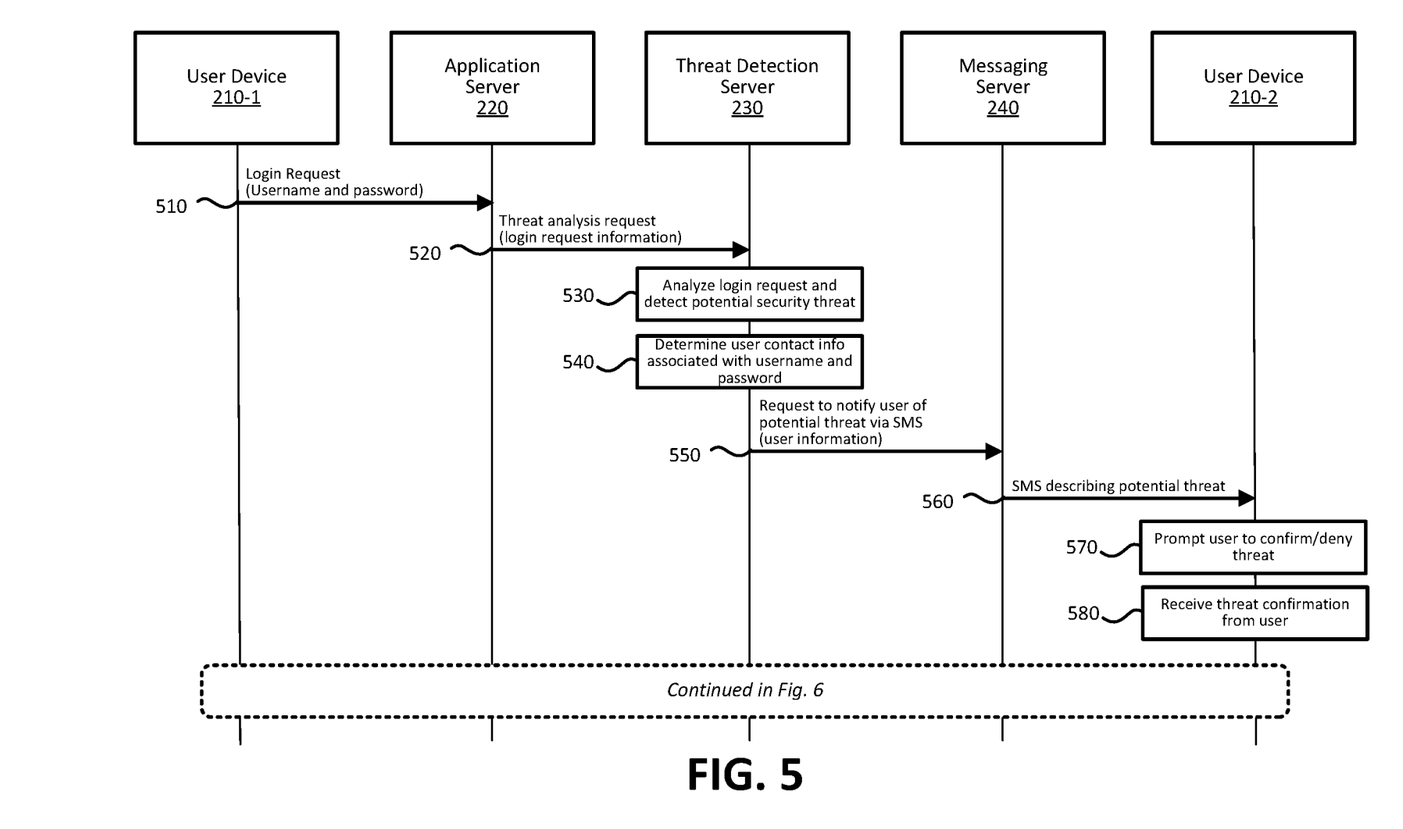
FIGS. 5 and 6 are sequence flow diagrams of an example for enabling a user to implement two-factor authentication regarding a network service.
Figure 6:
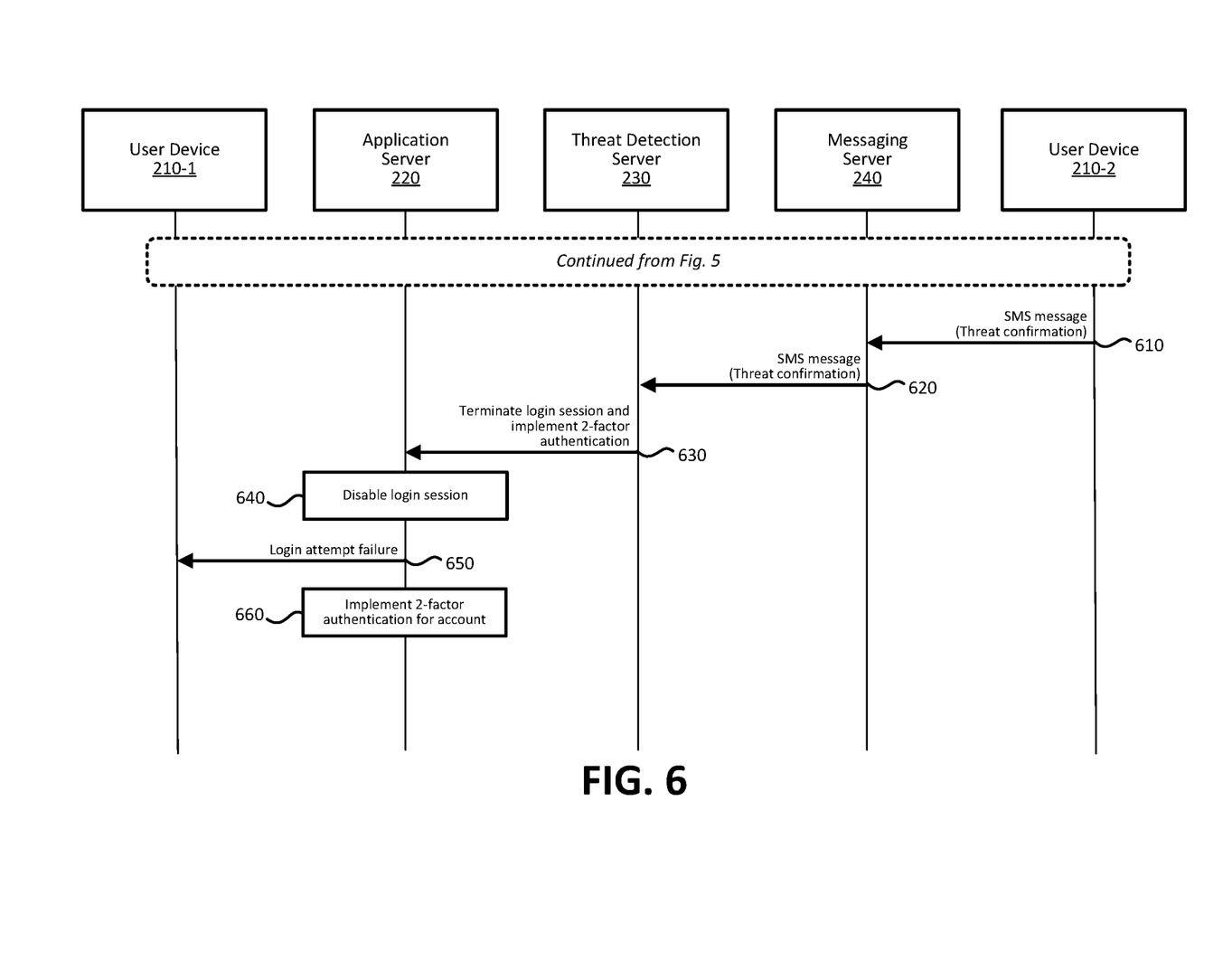

FIGS. 5 and 6 are sequence flow diagrams of an example for enabling a user to implement two-factor authentication regarding a network service account. As shown, FIG. 5 includes user device 210-1, user device 210-2, application server 220, threat detection server 230, and messaging server 240. Application server 220, threat detection server 230, and messaging server 240 are described above with reference to FIG. 2. User device 210-1 and user device 210-2 may be examples of user device 210, which is also described above with reference to FIG. 2.

For purposes of explaining FIGS. 5 and 6, assume that user device 210-1 belongs to a user that is not authorized to access the network service account and that user device 210-2 belongs to a user that is authorized to access the network service account. Additionally, in some implementations, an example for enabling a user to implement two-factor authentication regarding a network service may include fewer operations or devices, additional operations or devices, and/or alternative operations or devices than those depicted in FIGS. 5 and 6.

As shown, user device 210-1 may send a request to application server 220 to login to a particular network service account (line 510). The login request may include a username and password for completing an authentication process of application server 220. Application server 220 may send a request to threat detection server 230 for a threat analysis corresponding to the login request (line 520). The request from application server 220 may include information describing the login attempt, such as the username submitted by user device 210-1, the password submitted by user device 210-1, an IP address of user device 210-1, a location of user device 210-1, a time that the login request was sent from user device 210-1 or received by application server 220, etc.

Additionally, or alternatively, the request may include information corresponding to a user account associated with the username and password, such as a name of a user, a street address of the user, an email address of the user, an MDN associated with the user, billing information associated with the user, etc. As such, in some implementations, application server 220 may perform a preliminary authentication of the username and password in order to verify that the username and password correspond to an actual account of the network service and/or to identify the user account associated with the username and password. In some implementations, application server 220 may request that the analysis be performed for any user account that corresponds to either the username or password.

Threat detection server 230 may analyze the login request information and detect a potential security threat (block 530). In some implementations, threat detection server 230 may create a data set to which the information corresponding to the login request may be compared. For example, if the login request includes the IP address of user device 210-1, the username, the password, the geographical location of user device 210-1, and a time that the login request was sent, threat detection server 230 may determine historical data, corresponding to the username and password, to see if there is a history of the username and password being submitted from the same IP address, the same geographical location, and on or about the same time.

Threat detection server 230 may identify the user contact information associated with the username and password (block 540). In some implementations, the user contact information may include an MDN associated with the username and password, IP address of user device 210-1, etc. Threat detection server 230 may send a request, to messaging server 240, to notify the user associated with the username and password of the potential security threat (line 550). For example, threat detection server 230 may send a message to messaging server 240. The message may include the MDN associated with the username and password and a description of the security threat (e.g., that a login attempt has been initiated, the geographic location of the login attempt, the time of the login attempt, etc.).

The message may also, or alternatively, include a prompt, a question, etc., for the user to confirm whether the login attempt is a security threat. In some implementations, the message may also include instructions explaining to the user how to confirm whether the login is a security threat (e.g., "Reply 'Yes' to this message to confirm that the login attempt described above is a security threat," or "Reply 'No' to this message if you recognize this login attempt"). As shown, messaging server 240 may relay the request from threat detection server 230 to user device 210-2 (line 560).

User device 210-2 may receive the message and prompt the user of user device 210-2 to confirm or deny whether the login request is a security threat (block 570). As mentioned above, assume that the login request is a security threat. As such, user device 210-2 may receive information, from the user of user device 210-2, confirming that the login request is a security threat (block 580). In some implementations, this may include the user typing a word or code into a text box designed for creating messages. In some implementations, this may include the user selecting a button presented to the user in a GUI of user device 210-2, providing a voice command via a microphone of user device 210-2, etc.

Referring now to FIG. 6, user device 210-2 may send the threat confirmation to messaging server 240 (line 610), and messaging server 240 may relay the threat confirmation to threat detection server 230 (line 620). Threat detection server 230 may communicate instructions to application server 220 about how to respond to the login request received from user device 210-1 (block 630). For example, threat detection server 230 may send instructions to terminate the login session created by the login request from user device 210-1 and implement two-factor authentication for the network service corresponding to the username and password submitted by user device 210-1.

As such, application server 220 may proceed by terminating the login session involving user device 210-1 (block 640). Application server 220 may notify user device 210-1 that the login session has been disabled (and/or that the login request has failed or been denied) (line 650). Additionally, or alternatively, application server 220 may enable two-factor authentication for the network service that user device 210-1 attempted to access (block 660).

As described herein, the two-factor authentication service may be enabled for all user devices 210 that attempt to access the network service account. In some implementations, the two-factor authentication service may be enabled for user devices 210 that are similar to user device 210-1 in one or more ways (e.g., that correspond to a similar manufacturer, service provider, operating system, browser, a current time and geographic location, etc.). In some implementations, the two-factor authentication service may be enabled for all user devices (that attempt to access the network service account in question) except for the user device that caused the two-factor authentication service to be enabled (e.g., user device 210-2). As described above, the two-factor authentication service may remain active until application server 220 deactivates the two-factor authentication service in response to one or more preselected events, such as a user successfully logging into the network service account and manually disabling the two-factor authentication service, a message (e.g., an SMS message) that includes an instruction from user device 210-1 to disable the two-factor authentication service, etc.

Figure 7:
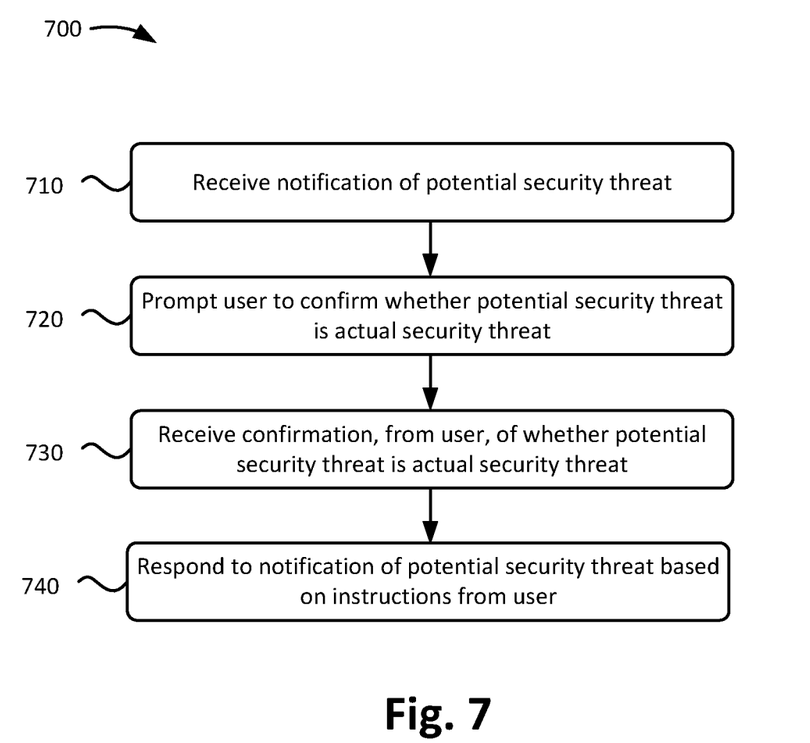
FIG. 7 is a flowchart diagram of an example process for responding to a notification regarding a potential security threat.

FIG. 7 is a flowchart diagram of an example process 700 for responding to a notification regarding a potential security threat. In some implementations, process 700 may be implemented by user device 210.

As shown, process 700 may include receiving a notification of a potential security threat (block 710). For example, user device 210 may receive a message indicating that a potential security threat has occurred. The message may identify the network service account that corresponds to the potential security threat (e.g., an online banking account, an email account, a social networking account, etc.), along with a description of the potential security threat (e.g., identify the device that is the source of the potential security threat, describe the geographic location of the device, the time that the potential security threat was initiated, the type of activity engaged in by the device (e.g., a login request), etc.).

Process 700 may also include prompting the user to confirm whether the potential security threat is an actual security threat (block 720). In some implementations, the notification may include instructions for how to confirm or deny whether the potential security threat is an actual security threat. In some implementations, the notification may also inform the user that confirming that an actual security threat is occurring will cause enhanced security procedures (e.g., two-factor authentication) to be implemented.

Process 700 may include receiving a confirmation, from the user, of whether the potential security threat is an actual security threat (block 730). For instance, user device 210 may receive information from the user about whether the potential security threat should be treated as an actual security threat. The user may input the information by pressing one or more buttons presented to the user, by spelling out a particular word or phrase, or in another way.

Process 700 may include responding to the notification of the potential security threat based on information from user (block 740). For instance, user device 210 may generate a message (such as a SMS message, an MMS message, an email message, or another type of message) and may communicate the message to a network device, such as messaging server 240. As described herein, the message may cause an application server corresponding to the network security account under threat to be protected by causing a two-factor authentication service to be used for authenticating subsequent login requests (e.g., by requesting a second factor of authentication, such as a further password, a biometric reading, a verification code, and/or some other form of authentication). As described above, the two-factor authentication service may remain in effect until, for example, the user logs into (e.g., via a browser) a website corresponding to the network service account and manually disables service. In some implementations, the user may also, or alternatively, disable the two-factor authentication service by sending a message (e.g., with a particular word or phrase) to, for example, threat detection server 230. In some implementations, the two-factor authentication service may remain in effect until a pre-selected period of time (e.g., a number of minutes, hours, days, weeks, etc.) has transpired.

Figure 8:
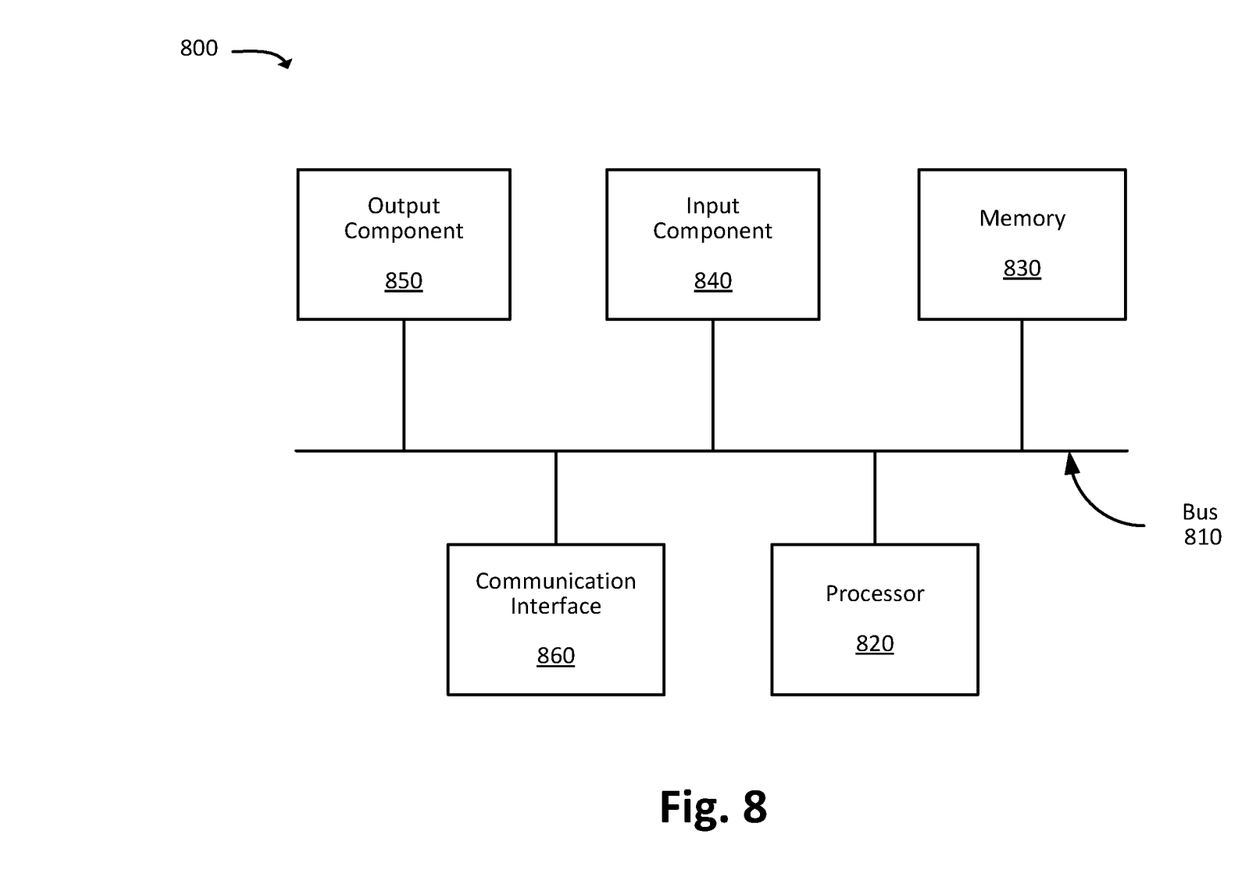
FIG. 8 is a diagram of example components of a device.

FIG. 8 is a diagram of example components of a device 800. Each of the devices illustrated in FIGS. 1, 2, 5, and 6 may include one or more devices 800. Device 800 may include bus 810, processor 820, memory 830, input component 840, output component 850, and communication interface 860. In another implementation, device 800 may include additional, fewer, different, or differently arranged components. As described herein, a component may be implemented by hardware circuitry, software logic, and/or some combination thereof.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes (LEDs), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1 and 4-8 the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by one or more devices and from a first user device, a first request to access a particular network service account based on a first username and a first password provided by the first user device to the one or more devices;
   determining, by the one or more devices, and based on historical access information regarding the particular network service account, whether the first request to access the particular network service account is a potential security threat;
   when determining that the first request is not a potential security threat, based on the historical access information, authenticating the first request based on the first username and the first password received from the first user device;

when determining it is not determined that the first request is authorized a potential security threat, based on the access information:
communicating, by the one or more devices and to a second user device previously associated with the particular network service account, a request to confirm whether the first request is an actual security threat;
receiving, from the second user device, a response to the request to confirm whether the first request is an actual security threat;
when the response from the second user device does not confirm that the first request is an actual security threat:
authenticating the first request based on the first username and the first password, and
forgoing requiring at least two factors of authentication for a second request to access the particular network service account, received after the first request, from the first user device or from the second user device; and
when the response from the second user device confirms that the first request is an actual security threat:
denying the first request from the first user device, and
requiring at least two factors of authentication for a third request to access the particular network service account, received after the first request, from the second user device.

2. The method of claim 1, wherein the communicating with the second user device includes communicating a first Short Messaging Service (SMS) message to the second user device.

3. The method of claim 2, wherein the receiving of the confirmation from the second user device includes receiving a second SMS message from the second user device.

4. The method of claim 1, wherein the at least two factors of authentication include a Short Messaging Service (SMS) message being sent to the second user device.

5. The method of claim 1, further comprising:
disabling a login session, corresponding to the first request to access the particular network service account, when the response, to the request to confirm whether the first request device is an actual security threat, confirms that the first request is an actual security threat.

6. The method of claim 1, wherein the historical access information includes a first geographical location associated with a previous access of the particular network service account, wherein determining whether the first request is a potential security threat further includes:
identifying a second geographic location associated with the first user device at a time that the first username and the first password were provided by the first user device; and
comparing the first geographic location with the second geographic location.

7. The method of claim 1, wherein the historical access information includes a first Internet Protocol (IP) address associated with a previous access of the particular network service account, wherein determining whether the first request is a potential security threat further includes:
identifying a second IP address associated with the first user device at a time that the first username and the first password were provided by the first user device; and
comparing the first IP address with the second IP address.

8. The method of claim 1, wherein the historical access information further includes a first time of day associated with a previous access of the particular network service account, wherein determining whether the first request is a potential security threat further includes:
identifying a second time of day corresponding to when the first username and the first password were provided by the first user device; and
comparing the first time of day with the second time of day.

9. One or more server devices, comprising:
a non-transitory memory device storing a plurality of processor-executable instructions; and
a processor configured to execute the processor-executable instructions, wherein executing the processor-executable instructions causes the processor to:
receive, from a first user device, a first request to access a particular network service account based on a first username and a first password provided by the first user device to the one or more server devices;
determine, based on the historical access information regarding the particular network service account, whether the first request to access the particular network service account is a potential security threat;
when determining that the first request is not a potential security threat, based on the historical access information, authenticate the first request based on the first username and the first password received from the first user device;
when determining that the first request is a potential security threat, based on the historial access information:
communicate, to a second user device previously associated with the particular network service account, a request to confirm whether the first request is an actual security threat;
receive, from the second user device, a response to the request to confirm whether the first request is an actual security threat;
when the response from the second user device does not confirm that the first request is an actual security threat:
authenticate the first request based on the first username and the first password, and
forgo requiring at least two factors of authentication for a second request to access the particular network service account, received after the first request, from the first user device or from the second user device; and
when the response from the second user device confirms that the first request is an actual security threat:
deny the first request from the first user device, and
require at least two factors of authentication for a third request to access the particular network service account, received after the first request, from the second user device.

10. The one or more server devices of claim 9, wherein executing the processor-executable instructions, to communicate with the second user device, further causes the processor to:
communicate a Short Messaging Service (SMS) message to the second user device.

11. The one or more server devices of claim 9, wherein the at least two factors of authentication include a Short Messaging Service (SMS) message being sent to the second user device.

12. The one or more server devices of claim 9, wherein executing the processor-executable instructions further causes the processor to:
   disable a login session, corresponding to the first request to access the particular network service account, when the response, to the request to confirm whether the first request is an actual security threat, confirms that the first threat is an actual security threat.

13. The one or more server devices of claim 9, wherein the historical access information includes a first geographical location associated with a previous access of the particular network service account, wherein executing the processor-executable instructions, to determine whether the first request is a potential security threat, further causes the processor to:
   identify a second geographic location associated with the first user device at a time that the first username and the first password were provided by the first user device; and
   compare the first geographic location with the second geographic location.

14. The one or more devices of claim 9, wherein the historical access information further includes a first time of day associated with a previous access of the particular network service account, wherein executing the processor-executable instructions, to determine whether the first request is a potential security threat, further causes the processor to:
   identify a second time of day corresponding to when the first username and the first password were provided by the first user device; and
   compare the first time of day with the second time of day.

15. A non-transitory computer-readable medium, storing a set of processor-executable instructions, which, when executed by one or more processors of a device, cause the one or more processors to:
   receive, from a first user device, a first request to access a particular network service account based on a first username and a first password provided by the first user device to the one or more server devices;
   determine, based on the historical access information regarding the particular network service account, whether the first request to access the particular network service account is a potential security threat;
   when determining that the first request is not a potential security threat, based on the historical access information, authenticate the first request based on the first username and the first password received from the first user device;
   when determining that the first request is a potential security threat, based on the historical access information:
      communicate, to a second user device previously associated with the particular network service account, a request to confirm whether the first request is an actual security threat;
      receive, from the second user device, a response to the request to confirm whether the first request is an actual security threat;
      when the response from the second user device does not confirm that the first request is an actual security threat:
         authenticate the first request based on the first username and the first password, and
         forgo requiring at least two factors of authentication for a second request to access the particular network service account, received after the first request, from the first user device or the second user device; and
      when the response from the second user device confirms that the first request is an actual security threat:
         deny the first request from the first user device, and
         require at least two factors of authentication for a third request to access the particular network service account, received after the first request, from the second user device.

16. The non-transitory computer-readable medium of claim 15, wherein the processor-executable instructions, to communicate with the second user device, further include processor-executable instructions to:
   communicate a Short Messaging Service (SMS) message to the second user device.

17. The non-transitory computer-readable medium of claim 15, wherein the at least two factors of authentication include a Short Messaging Service (SMS) message being sent to the second user device.

18. The non-transitory computer-readable medium of claim 15, wherein the processor-executable instructions further include processor-executable instructions to:
   disable a login session, corresponding to the first request to access the particular network service account, when the response, to the request to confirm whether the first request is an actual security threat, confirms that the first request is an actual security threat.

19. The non-transitory computer-readable medium of claim 15, wherein the historical access information includes a first geographical location associated with a previous access of the particular network service account, wherein the processor-executable instructions, to determine whether the first request is a potential security threat, further include processor-executable instructions to:
   identify a second geographic location associated with the first user device at a time that the first username and the first password were provided by the first user device; and
   compare the first geographic location with the second geographic location.

20. The non-transitory computer-readable medium of claim 15, wherein the historical access information includes a first Internet Protocol (IP) address associated with a previous access of the particular network service account, wherein the processor-executable instructions, to determine whether the first request is a potential security threat, further include processor-executable instructions to:
   identify a second IP address associated with the first user device at a time that the first username and the first password were provided by the first user device; and
   compare the first IP address with the second IP address.

* * * * *